United States Patent [19]

Maxel

[11] 4,003,368

[45] Jan. 18, 1977

[54] ARTICLE TRANSPARENT TO MICROWAVES AND PROCESS FOR MAKING SAME

[75] Inventor: John M. Maxel, St. Charles, Ill.

[73] Assignee: Armco Steel Corporation, Middletown, Ohio

[22] Filed: June 27, 1974

[21] Appl. No.: 483,794

[52] U.S. Cl. .................. 126/390; 219/10.55 E; 229/2.5 R; 260/40 R; 260/862; 264/26; 264/331; 264/DIG. 46

[51] Int. Cl.² .................................. C08F 43/08

[58] Field of Search ..... 264/331, 316, 26, DIG. 46; 260/40, 862; 229/2.5; 219/10.55 E, 10.55 M; 126/390

[56] References Cited

UNITED STATES PATENTS

| | | | |
|---|---|---|---|
| 3,079,913 | 3/1963 | Nelson | 126/390 |
| 3,302,632 | 2/1967 | Fichtner | 126/390 |
| 3,519,517 | 7/1970 | Dench | 219/10.55 M |
| 3,615,713 | 10/1971 | Stevenson | 219/10.55 E |
| 3,701,748 | 10/1972 | Kroekel | 264/331 |
| 3,737,488 | 6/1973 | Porter et al. | 264/26 |
| 3,801,693 | 4/1974 | Stallings et al. | 264/331 |
| 3,823,219 | 7/1974 | Ward, Jr. et al. | 264/331 |

OTHER PUBLICATIONS

Doyle, "Development & Use of Polyester Products", McGraw-Hill Book Co., N.Y., 1969, p. 253.

Primary Examiner—Jeffery R. Thurlow
Attorney, Agent, or Firm—Johnston, Keil, Thompson & Shurtleff

[57] ABSTRACT

A burn-resistant article transparent to microwaves and suitable for use in a microwave oven, either as a receptacle for supporting articles to be heated, for shelving, housing or parts of housing, is prepared from a sheet molding composition.

4 Claims, 4 Drawing Figures

ARTICLE TRANSPARENT TO MICROWAVES AND PROCESS FOR MAKING SAME

BACKGROUND

Because of the introduction of microwave ovens which are employed particularly for heating foods, there has been a need for receptacles which can be placed in such ovens and will support articles to be heated while allowing microwaves to pass through the receptacle without heating, charring or melting the receptacle. One type of receptacle which has been employed satisfactorily for this purpose is a tray molded from a Bulk Molding Composition (BMC) consisting of various resins reinforced with fiberglass. Conventional polyester resis systems which have been employed to make trays for this purpose have given rather poor performance in microwave applications.

OBJECTS

One of the objects of the present invention is to provide a new and improved process for making receptacles which have adequate strength for supporting articles such as food articles in a microwave oven and at the same time allow microwaves to pass through the receptacle wtihout heating up, charring or melting.

Another object of the invention is to provide a process for making molded articles which are highly resistant to burning in microwave applications and can be employed in microwave ovens for shelving, housing or parts of housings.

Still a further object of the invention is to provide a process of preparing new and improved burn-resistant articles for use in microwave ovens from a Sheet Molding Composition (SMC).

Other objects and advantages of the invention will appear from the following description in conjunction with the accompanying drawing.

THE DRAWING

BRIEF SUMMARY OF THE INVENTION

Figure 1:
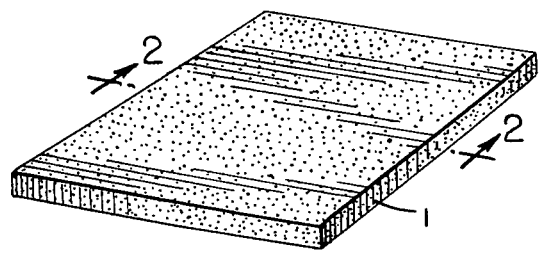
FIG. 1 illustrates in perspective a molded article made in accordance with the invention which is transparent to microwaves and is adapted to be used for supporting articles in a microwave oven.

In accordance with the invention a burn-resistant article transparent to microwaves and suitable for use in a microwave oven is molded from a Sheet Molding Composition comprising a mixture of an unsaturated cross linkable polyester of a dicarboxy acid and a dihydric alcohol, a cross linking inhibitor, a chemically inert powdered filler, a thermoplastic polymer, a cross linking monomer capable of cross linking with said polyester to form a thermosetting resin, cut bundles of glass filaments, a catalyst for the cross linking reaction, a thickening reactant, and a mold release ingredient.

DETAILED DESCRIPTION OF THE INVENTION

A sheet molding composition can be prepared by mixing together the resins (including the cross linking monomer), the filler, and the catalyst followed by the addition of the thickening reactant and stirring to disperse the ingredients while the compound paste is still pourable. The compound paste is then distributed uniformly on a carrier sheet, cut bundles of glass filaments are added to the top of the paste, a second carrier with similarly applied compound paste is superimposed over the top of the first paste, and the composite sheet is kneaded between said carrier sheets to cause said cut bundles of glass filaments to be distributed uniformly in the interior of the composite sheet.

The sheet molding composition is then preferably aged at 90° F. (could be 60°–150° F.) until the viscosity of the compound paste reaches a viscosity of $30$–$50 \times 10^6$ cps (could be 2 to $100 \times 10^6$ cps) which at 90° F. requires two to three days (could be one to fourteen days). The carrier sheets are now strippable and the sheet molding composition is now ready for molding.

The molding process may be carried out by stripping said strippable sheets from said composite sheet, cutting said sheet into segments of a size suitable for molding a predetermined article or a flat sheet, placing said segments in a mold between solid smooth heated dies (which are male and female in the case of three dimensional trays) and molding said article between said dies at temperatures (usually about 300° F.) sufficiently high to cause cross linking to occur between said polyester and said cross linking monomer.

It is essential, of course, that the aging of the sheet molding composition occur at temperatures below the temperatures at which the cross linking of the polyester occurs because the cross linking of the polyester must occur during the molding process.

Polyesters derived from aliphatic unsaturated carboxylic acids or anhydrides such as maleic anhydride and aliphatic dihydric alcohols (glycols) such as, for example, those in which the hydroxyl groups are connected by ethylene, diethylene, propylene, dipropylene, trimethylene, neopentyl or saturated or unsaturated homologues thereof, are especially suitable for the practice of the invention. These polyesters can be prepared as solutions in styrene or other cross linking monomers such as, for example, vinyl toluene.

The thermoplastic resin is preferably an acrylic type resin, for example, a thermoplastic copolymer of methylmethacrylate and ethylacrylate in an 87:13 weight ratio having a molecular weight of about 150,000. The thermoplastic copolymer will usually be dissolved in styrene in a 40:60 weight ratio and is called a thermoplastic syrup.

The weight ratio of polyester to thermoplastic syrup is usually within the range of 70:30 to 50:50 and preferably 60:40.

The cross linking inhibitor is preferably para-benzoquinone but can be another inhibitor of a similar type (quinone or hydroquinone) which functions in a similar manner to inhibit cross linking of the polyester at temperatures below its processing or curing temperature.

The catalyst is preferably tertiary butyl perbenzoate but other peroxide type catalysts can be used.

The mold release ingredient is preferably zinc stearate but other similar types of mold release compounds such as, for example, calcium stearate or fatty acid phosphates (e.g., duPont Zelac), can be employed.

The thickening reactant is preferably magnesium hydroxide. Other thickening reactants that can be employed are, for example, the oxides and hydroxides of calcium, magnesium, strontium and barium which are in Class II(a) of the Periodic Table of Elements. Magnesium hydroxide is preferred because it apparently has just the right properties to bring about the desired thickening reaction in a suitable period of time. This thickening reaction is believed to involve a cross linking between the metal of the thickening reactant and carboxy and/or hydroxy groups attached to linear chains of the polyester.

The weight ratio of monomer to total unsaturated polyester and thermoplastic polymer is usually approximately 50:50, but this is subject to variation.

The amount of catalyst can vary with different catalysts and an overall range is 0.5 to 2.0% by weight of the total resin forming components. A preferred amount is approximately 1% by weight.

The ratio of filler to total resin components is usually within the range of 1:1 to about 3:1. This ratio is based on the use of calcium carbonate having an oil absorption of 10 and an average particle size of 2.5 microns. Other fillers, such as clays, and talcs, with different absorbency will have a different ratio.

The resultant compound resin paste obtained by stirring or agitating all of the above ingredients has a Brookfield viscosity within the range of 15,000 to 150,000, preferably 50,000 to 100,000 centipoises at 77° F., and is therefore quite thick but is still pourable so that it can be poured onto the carrier sheet and converted into a thick paste usually around 1/16 to 3/16 inch in thickness by passing the carrier sheet containing said mixture beneath a doctor blade, the lower end of which is spaced from the carrier sheet a distance corresponding to the desired thickness. The doctor blade forms a dam beneath which the mixture passes. Thereafter the cut bundles of glass filaments which are usually about one inch in average length are added to the top of the layer. A second layer of the mixture is applied to a second carrier sheet and passed under a doctor blade forming a sandwich. The resultant sandwich is kneaded between alternately spaced rollers so as to cause the cut bundles of glass filaments to be distributed uniformly throughout the heterogeneous mass.

The carrier sheets used in the foregoing process are usually polyolefine films, for example, polyethylene or polypropylene, but can be any type of sheet having a surface from which the molding compound sheet can be separated after aging.

The inhibitor which prevents the cross linking reaction from taking place until the sheet molding composition is heated between two dies is normally present in the polyester resin component where commercial polyesters are used. The amount of inhibitor can be 50 to 1,000 parts per million (ppm) depending on the kind and amount of catalyst but is usually within the range of 100 to 700 ppm preferably about 300 ppm, based on the weight of the total resin forming solution (e.g., polyester and thermoplastic resin in styrene).

Molding temperatures are subject to variation but should usually be within the range of 300° F. to 325° F. with a molding period of 1–3 minutes depending upon the cross section.

The pressures used in the molding process are usually within the range of 500 to 1000 psig.

The invention will be further illustrated but is not limited by the following example in which the quantities are by weight unless otherwise indicated.

EXAMPLE

The process was carried out in the manner previously described using the following ingredients:

| Ingredients | Parts by Weight |
| --- | --- |
| Unsaturated cross linkable polyester obtained by esterifying 1.05 moles of propylene glycol with 1.0 mole of maleic anhydride to an acid number of 52 dissolved in styrene at 62.5% solids (Rohm & Haas P-340 can be used) | 15.6 |
| Thermoplastic polymer of methylmethacrylate and ethylacrylate (87/13 weight ratio) having a molecular weight of about 150,000 dissolved in styrene at 31.3% solids (Rohm & Haas P-681 and P-701 can be used) | 10.4 |
| Calcium carbonate (Camelwite) | 52.46 |
| Tertiary butyl perbenzoate (catalyst) | 0.26 |
| Zinc stearate | 0.5 |
| Magnesium hydroxide | 0.78 |
| Cut bundles of glass fibers in 1 inch lengths (Owens-Corning Fiberglas 433) | 20 |

The ingredients were added in the order listed, the mixing procedure was carried out and the sheet molding composition was formed in the manner previously outlined.

Figure 2:
FIG. 2 is a cross section taken along the lines 2, 2 of FIG. 1.
Figure 3:
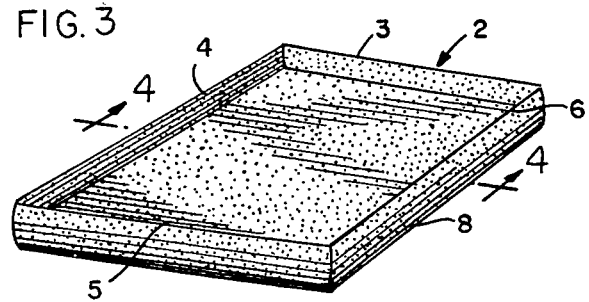
FIG. 3 is a perspective view of a three dimensional tray type receptacle adapted to be used in microwave ovens and having integrally molded top and bottom sides.
Figure 4:
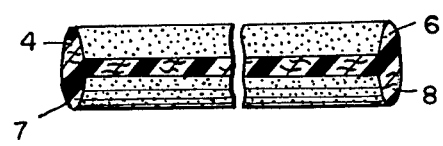
FIG. 4 is a cross section, with parts broken away, taken along the line 4,4 of FIG. 3.

A molding operation can be carried out using a sheet molding composition approximately 1/16 inch to 3/16 inch thick formed from the foregoing composition. The material is cut in a number of plies in the form of rectangular charges which will cover only 50% to 70% of the mold surface area. The size and amount of material will vary depending upon the part shape and volume of the part. The mold when closed will cause the material to flow and fill the mold. The part is cured at a temperature of 300° F. for one minute to three minutes at a pressure of 500 to 1000 psig resulting in the production of molded flat articles of the type illustrated at FIG. 1 as shown in cross section in FIG. 2. Using three dimensional dies a tray can be formed as shown at 2 in FIG. 3 which has peripheral sides or edges 3, 4, 5 and 6 and downwardly depending peripheral ribs 7 and 8 as shown in FIG. 4 which act as supporting surfaces.

In the foregoing example instead of propylene glycol other glycols can be employed, for example, dipropylene glycol, diethylene glycol, neopentyl glycol, trimethylene glycol, and pentane diol. The proportions used should be such as to develop a highly exothermic reaction during polymerization. A part of the maleic anhydride can be replaced by a saturated acid, e.g., isophthalic acid. Usually approximately equimolecular proportions of maleic anhydride and glycol are employed and the polyester is synthesized to an acid number of 25 to 55 (could be as low as 5–10) and then dissoled in the styrene monomer at a 60–70% solids concentration. While tertiary butyl perbenzoate is the preferred catalyst, other types of organic peroxides which are soluble in the hydrophobe or resin phase can be employed, e.g., benzoyl peroxide, acetyl benzoyl peroxide, cumene hydroperoxide, and other oil soluble oxygen-free radical catalysts. Other types of polymerization catalysts may be used.

While styrene is the preferred cross linking monomer, other monomeric aryl compounds having an unsaturated side chain can be employed, e.g., vinyl toluene, vinyl ethylbenzene, alpha methylstyrene, vinyl chlorobenzenes, vinyl xylenes, and diallylphthalate.

Other thermoplastic acrylic copolymers may be employed which are compatible with the unsaturated polyester-styrene system including copolymers in which one or more of the monomers is an alkyl ester of acrylic or methacrylic acids, or the like. Examples of other thermoplastic acrylic copolymers as well as unsaturated polyester-styrene systems are given in U.S. Pat. No. 3,701,748, the disclosure of which is incorporated herein by reference.

In practicing the invention the cut bundles of glass filaments can be obtained commercially in the form of rovings containing 60 strands per roving and 204 filaments per strand. For the purpose of this invention the rovings are preferably cut to lengths within the range of ¼ inch to 3 inches and the quantity of glass fibers or filaments constitutes from 5% to 35% by weight of the molded article.

The molded article is burn-resistant to microwaves of 1915 to 2450 megahertz. It has a dielectric constant not greater than 5, high chemical resistance so as to be unaffected by detergents, high abrasion resistance, and is essentially unbreakable under ordinary conditions of use. It will meet microwave oven requirements such as a maximum power factor of $3 \times 10^{-3}$, a maximum loss factor of $15 \times 10^{-3}$, a minimum heat distortion temperature of 350° F. and a maximum water absorption of 0.2% in 24 hours.

The invention is hereby claimed as follows:

1. A molded burn-resistant article, for use in microwave ovens transparent to microwaves of 1915 to 2450 megahertz, said article having a maximum dielectric constant not greater than 5, having chemical resistance unaffected by detergents, having high abrasion resistance, and being essentially unbreakable under ordinary usage conditions in microwave ovens, and being obtained by molding a sheet molding composition consisting essentially of a mixture of an unsaturated cross linkable polyester of a dicarboxy acid and a dihydric alcohol, a cross linking inhibitor, a chemically inert powdered filler, a thermoplastic polymer, a cross linking monomer capable of cross linking with said polyester to form a thermosetting resin, cut bundles of glass filaments, a catalyst for the cross linking reactant, a thickening agent, and a mold release ingredient, said sheet molding composition containing 5% to 35% by weight of cut bundles of glass filaments ¼ inch to 3 inches long, between solid smooth heated dies at pressures and temperatures sufficiently high to cause cross linking between said polyester and said cross linking monomer.

2. A burn-resistant article as claimed in claim 1 in which said polyester is the reaction product of maleic anhydride and an aliphatic diol synthesized to an acid number of 5 to 55, said cross linking monomer is a monomeric aryl compound having an unsaturated side chain and said thermoplastic polymer is an acrylic copolymer in which one or more of the monomers is an alkyl ester of acrylic or methacrylic acids.

3. A burn-resistant article as claimed in claim 1 which is in the form of a tray adapted to hold substances to be subjected to microwaves in a microwave oven.

4. A burn-resistant article as claimed in claim 2 which is adapted to hold substances to be subjected to microwaves in a microwave oven.

* * * * *